United States Patent [19]

Takada

[11] Patent Number: 5,072,114
[45] Date of Patent: Dec. 10, 1991

[54] LIGHT BEAM SCANNING APPARATUS AND LIGHT BEAM ADJUSTING MECHANISM FOR USE WITH SUCH LIGHT BEAM SCANNING APPARATUS

[75] Inventor: Norihisa Takada, Kanagawa, Japan

[73] Assignee: Fuji Photo Film Co., Ltd., Kanagawa, Japan

[21] Appl. No.: 545,018

[22] Filed: Jun. 28, 1990

[30] Foreign Application Priority Data

Jun. 30, 1989 [JP] Japan .................................. 1-168834
Jun. 30, 1989 [JP] Japan .................................. 1-168835

[51] Int. Cl.$^5$ .......................... H01J 3/14; G01D 9/42
[52] U.S. Cl. ................................ 250/235; 346/108; 359/213
[58] Field of Search .................. 250/235, 236, 237 G; 350/6.5, 6.6, 6.8; 346/108; 358/480, 481

[56] References Cited

U.S. PATENT DOCUMENTS

| | | | |
|---|---|---|---|
| 4,297,713 | 10/1981 | Ichikawa et al. | 350/6.8 |
| 4,383,755 | 5/1983 | Fedder et al. | 358/481 |
| 4,563,056 | 1/1986 | Tagawa et al. | 350/6.8 |
| 4,796,964 | 1/1989 | Connell et al. | 350/6.8 |
| 4,837,588 | 6/1989 | Imakawa et al. | 250/235 |
| 4,853,535 | 8/1989 | Suganuma | 250/235 |
| 4,908,511 | 3/1990 | Ishikawa et al. | 250/235 |

Primary Examiner—David C. Nelms
Assistant Examiner—Michael Messinger
Attorney, Agent, or Firm—Sughrue, Mion, Zinn, Macpeak & Seas

[57] ABSTRACT

The improved compact and inexpensive light beam scanning apparatus capable of scanning with a light beam for image recording or reading in an easy and yet precise manner has a first light source for emitting a scanning light beam that is positioned in the center of the optical unit in the apparatus, as well as a second light source for emitting a light beam to scan an image sync signal generating means for obtaining an image sync signal, which second light source is positioned either ahead of or behind said first light source in a sub-scanning direction. This arrangement obviates the use of heretofore necessary expensive optical elements such as AOM and those for synthesizing or separating light beams, whereby a smaller number of parts need be used than in the prior art. The positions of the respective light sources can be easily adjusted by a light beam adjusting mechanism of a simple design in which the sleeves for retaining these light sources are adapted to be movable relative to each other.

15 Claims, 8 Drawing Sheets

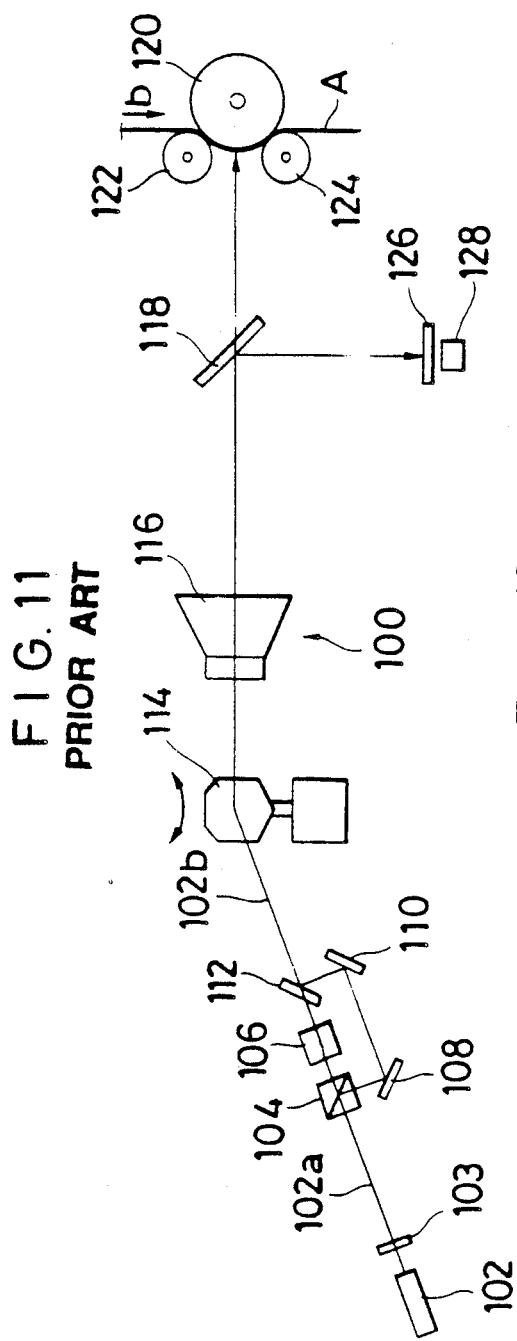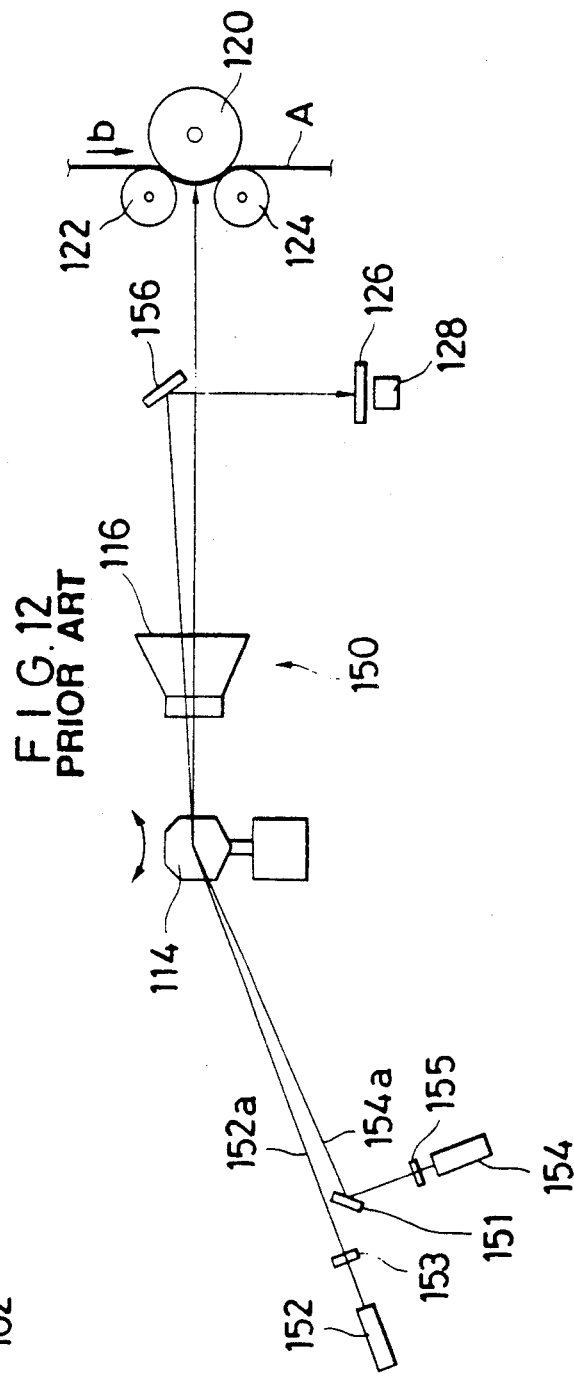

LIGHT BEAM SCANNING APPARATUS AND LIGHT BEAM ADJUSTING MECHANISM FOR USE WITH SUCH LIGHT BEAM SCANNING APPARATUS

BACKGROUND OF THE INVENTION

This invention relates to a light beam scanning apparatus such as an image recording or reading apparatus, as well as to a light beam adjusting mechanism for use with such apparatus. More particularly, this invention relates to a light beam scanning apparatus that has means of generating an image sync signal for performing precise image recording or reading, as well as to a mechanism for adjusting a light beam for generating said image sync signal.

DESCRIPTION OF THE PRIOR ART

Light beam scanning apparatuses using a faster scanning method with a light beam such as a laser beam are known and various types of such apparatuses have been proposed and used commercially as image recording apparatus, image reading apparatus, etc. With such light beam scanning apparatuses, a light beam deflected in the direction of main scanning by means of a light deflector is applied at a predetermined position onto a subject to be scanned such as a recording material, printed document or a photographic document that is being transported in a sub-scanning direction which is generally perpendicular to the main scanning direction, whereby said subject of interest is scanned two-dimensionally with the light beam to effect image recording or reading.

In order to produce satisfactory and high-quality image and to insure recording of an enlarged or reduced image in exact size or to perform image reading in an exact and satisfactory way, the light beam must be deflected to illuminate the exact position on the subject to be scanned such as a recording material and at the same time, the scanning speed of the light beam must be held constant. However, the mechanism of the conventional apparatus is such that considerable difficulty is involved in controlling the scan speed to a strictly constant value. Hence, the common technique employed to meet this need is to construct a signal for detecting the position of a scanning beam in accordance with the light deflector and to perform image recording in synchronism with this signal. A grid having alternate light-transparent and light-opaque areas is used as the means of generating such position detecting signal. This grid is scanned with a grid scanning light beam deflected by the same deflector as used to deflect a recording/reading light beam, and the change in the quantity of light beam passing through the grid is measured to obtain a signal for detecting the position of the image recording/reading light beam (which signal is hereinafter referred to as "an image sync signal"). Various types of light beam scanning apparatus that adjusts the performance of main scanning with the recording/reading light beam by means of this image sync signal have been proposed.

A typical image recording apparatus used as a light beam scanning apparatus having an image synchronizing grid is shown in FIG. 11. In the image recording apparatus generally indicated by 100 in FIG. 11, a light source 102 issues a light beam 102a that is shaped with a collimator lens 103 and which is split into two beamlets by means of a beam splitter 104. One beamlet is modulated with an acoustooptic modulator (AOM) 106 whereas the other beamlet remains unmodulated and passes through mirrors 108 and 110 and a beam splitter 112, where it is combined with the modulated beamlet to reconstruct a single optical axis.

A light beam 102b produced by synthesis of the modulated and unmodulated beamlets falls on a galvanometer mirror 114 and is thence reflected and deflected in the direction of main scanning. The deflected beam passes through an f$\theta$ lens 116 and is so adjusted that a beam spot which is equal in diameter in both main scanning and sub-scanning directions will be focused in a predetermined position on the sheet-like recording material A.

The light beam 102b emerging from the f$\theta$ lens 116 is then launched into a deflecting/separating mirror 118, by which the beam is again separated into the modulated beamlet and the unmodulated beamlet. The modulated beamlet passes through the deflecting/separating mirror 118 and focuses on the recording material A which is being transported in the sub-scanning direction indicated by arrow b as it is held on the exposure position by means of an exposure drum 120 and nip rollers 122 and 124, whereby the recording material A is exposed by two-dimensional scanning with the modulated beamlet.

The unmodulated beamlet reflected from the deflecting/separating mirror 118 falls on grid 126 for scanning it. The beamlet passing through the grid 126 is launched into a light collecting bar 128, detected as an optical signal with photodetector (not shown) and converted to an electric signal for image synchronization.

FIG. 12 shows another example of the image recording apparatus using an image synchronizing grid. In the image recording apparatus 100 shown in FIG. 11, the light beam emitted from the single light source 102 is split into two beamlets, one for image recording and the other for scanning the grid. In contrast, the image recording apparatus generally indicated by 150 in FIG. 12 has two light sources, an recording light source 152 and a synchronizing light source 154 for scanning the grid 126, and the two light beams emitted from these light sources are both reflected and deflected by the galvanometer mirror 114. Stated more specifically, a recording beam 152a that is emitted from the recording light source 152 and which is shaped by a collimator lens 153 is reflected and deflected by the galvanometer mirror 114 and passes through the f$\theta$ lens 116 to be focused on the sheet-like recording material A for exposing is by two-dimensional scanning.

A synchronizing beam 154a that is emitted from the grid scanning light source 154 and which is shaped by a collimator lens 155 is reflected in a predetermined direction by a mirror 151 and launched into the galvanometer mirror 114, whereby it is reflected and deflected in the same way as the recording beam 152a. The deflected beam 154a passes through the f$\theta$ lens 116 and is thereafter reflected by a mirror 156 in a generally perpendicular direction in such a way that it falls on the grid 126 for scanning it.

The synchronizing beam falling on the grid 126 in both image recording apparatuses 100 and 150 has been deflected in the same way as the recording beam incident on the recording material A. Further, this synchronizing beam is subjected to periodic changes in the quantity of light in response to the scanning of the grid. Hence, the electric signal obtained by measuring these changes in the quantity of light will serve as an image sync signal for detecting the correct position of the recording beam, whereby the recording beam is allowed to scan the recording material A in a more precise manner.

However, the image recording apparatus 100 shown in FIG. 11 which separates the light beam 102a from the single light source 102 into two beamlets, one for scanning the grid 126 and the other for image recording, has the disadvantage that it must use an expensive modulator such as AOM and that repeated separation and synthesis of light beams requires a complicated optical system, which results in the increase in the cost and size of the overall equipment.

On the other hand, the image recording apparatus 150 shown in FIG. 12 has the advantage that it does not have to use a modulator such as AOM or optical elements for separating and synthesizing light beams. However, at least two beam shaping optical components such as collimator lenses are necessary to produce properly shaped light beams and this again increases the cost and size of the overall equipment.

Further, in order to achieve satisfactory image recording or reading or to obtain a correct and reliable image sync signal with the light beam scanning apparatus such as the image recording apparatus 150, the optical distance of the beam emitted from each light source and the position at which the beam is launched into the associated beam shaping optical component must be adjusted in a appropriate way. The fθ lens typically used with such light beam scanning apparatus has an error of up to about 1% and in order to perform satisfactory image recording or reading the optical distances of the recording or reading beam and the synchronizing beam for scanning the grid must be adjusted correctly so that the respective beams will be focused in correct positions on the subject to be scanned and the grid.

If laser diodes and other light sources that inherently have astigmatism are to be used, the astigmatism is eliminated by adjusting the beam shaping optical unit in such a way that the collimator lens used in it is tilted with respect to the optical axis, typically by rotating it by a very small angle about the center line perpendicular to the optical axis (see Japanese Patent Application No. 153739/1987). However, if the configuration of the apparatus is such that the light beam is launched into the collimator lens after travelling along a path other than its optical axis, the adjusted collimator lens combines with the astigmatism of the light source to produce a beam spot that is in an oblique elliptical form. Such an elliptical beam is unsuitable for use as a recording or reading beam. Even if it is used as a synchronizing beam, it will span two adjacent light-opaque areas of the grid and fails to scan it in a satisfactory way, whereby it sometimes occurs that a correct and appropriate image sync signal cannot be obtained.

BRIEF SUMMARY OF THE INVENTION

It is therefore an object of the present invention to solve the aforementioned problems of the prior art by providing a small and inexpensive light beam scanning apparatus that obviates the use of an expensive modulator such as AOM and optical elements for separating and synthesizing light beams, whereby the number of expensive optical parts such as beam shaping optical components is reduced, and which yet is immune to deterioration of image quality and erroneous reading of image.

Another object of the present invention is to provide a light beam adjusting mechanism for use with a light beam scanning apparatus that contributes to reduction in its size and cost and that permits both the optical distance of a synchronizing beam and the position in which it is launched into a beam shaping optical component to be finely adjusted by means of a simple tool in an easy and rapid way, whereby image can be recorded or read in a consistent satisfactory manner.

The first object of the present invention can be attained by its first aspect which relates to a light beam scanning apparatus that uses a light beam deflected in the direction of main scanning in order to perform two-dimensional scanning of a subject to be scanned that is moving in a sub-scanning direction which is generally perpendicular to said direction of main scanning, which apparatus comprises means of generating an image sync signal, a first light source that emits a light beam for scanning said subject to be scanned, a second light source that emits a light beam for scanning said means of generating an image sync signal, and a beam shaping optical component that shapes the light beams emitted from said first and second light sources, said first light source being positioned on the optical axis of said beam shaping optical component, and said second light source being positioned either ahead of or behind said first light source in said sub-scanning direction.

The second object of the present invention can be attained by its second aspect which relates to a light beam adjusting mechanism for use with a light beam scanning apparatus in which a light beam emitted from a light source and deflected in the direction of main scanning is used to perform two-dimensional scanning of a subject to be scanned that is moving in a sub-scanning direction which is generally perpendicular to said direction of main scanning, and a light beam emitted from another light source is used to obtain an image sync signal, which mechanism comprises a first sleeve for retaining a beam shaping optical component in its center, a second sleeve that is positioned in in the center of said first sleeve and that retains the first light source on the optical axis of said beam shaping optical component, and a third sleeve that is fitted over said second sleeve for retaining the second light source, said third sleeve being not only movable along the optical axis of said beam shaping optical component but also rotatable with respect to said second sleeve.

In each of the aspects described above, a laser diode is preferably used a each of the first and second light sources.

In another preferred embodiment of each aspect, said beam shaping optical component is a collimator lens through which the light beams from both of said first and second light sources will pass.

In a preferred embodiment of the first aspect, said means of generating an image sync signal is a grid.

In another preferred embodiment of the first aspect, said first light source, said second light source and said beam shaping optical component are integrated in a unitary assembly.

In a further preferred embodiment of the first aspect, said first light source forms an angle of 5–10 degrees with the synchronizing beam emitted from said second light source.

In a still further preferred embodiment of the first aspect, said subject to be scanned is a sheet-like recording material.

In the second aspect, the first light source is preferably a scanning light source for scanning the subject to be scanned whereas the second light source is preferably a synchronizing light source for generating an image sync signal.

In another preferred embodiment of the second aspect, said collimator lens is rotatable about an axis perpendicular to the center line of said first sleeve.

In still another preferred embodiment of the second aspect, said image sync signal is obtained by scanning an image sync signal generating means with the light beam emitted from said second light source and which has been deflected in the same way is the light beam emitted from said first light source.

In a further preferred embodiment of the second aspect, said image sync signal generating means is a grid.

In still further preferred embodiment of the second aspect, said second sleeve is adapted to be movable along the optical axis of the beam shaping optical component with respect to the first sleeve.

BRIEF DESCRIPTION OF THE DRAWINGS

FIGS. 11 and 12 show schematically image recording apparatuses that use the design concept of prior art light beam scanning apparatuses.

DETAILED DESCRIPTION OF THE INVENTION

A light beam scanning apparatus according to the first aspect of the present invention is described below in detail with reference to FIGS. 1-6. Having the construction already outlined above, the light beam scanning apparatus according to the first aspect of the present invention obviates the use of an expensive modulator such as AOM and optical elements for separating and synthesizing light beams, whereby the number of expensive optical parts including beam shaping optical components such as collimator lenses can be reduced. As a result, the cost and size of the light beam scanning apparatus can be sufficiently reduced to realize an inexpensive and small image recording or reading apparatus as an application of such apparatus.

Further, the first and second light sources are positioned in the manner already described above, so despite the low cost and small size of the light beam scanning apparatus, the light beam from the first light source passes through the center of the beam shaping optical component to be appropriately shaped for permitting an image to be recorded or read in a satisfactory manner.

In addition, the light beam from the second light source passes through the beam shaping optical component along a path other than its optical axis, and the resulting astigmatism will allow said beam to fall on a predetermined position on the image sync signal generating means so as to form a beam spot that is elongated in the sub-scanning direction. If the image sync signal generating means such as grid is scanned with this elongated beam spot, the chance of the synchronizing beam being completely blocked by dust particles and other foreign matter on the grid is substantially reduced to insure that a desired image sync signal is obtained on all occasions.

A light beam scanning apparatus apparatus according to the first aspect of the present invention is described below in detail with reference to the preferred embodiments shown in FIGS. 1-6.

Figure 1:
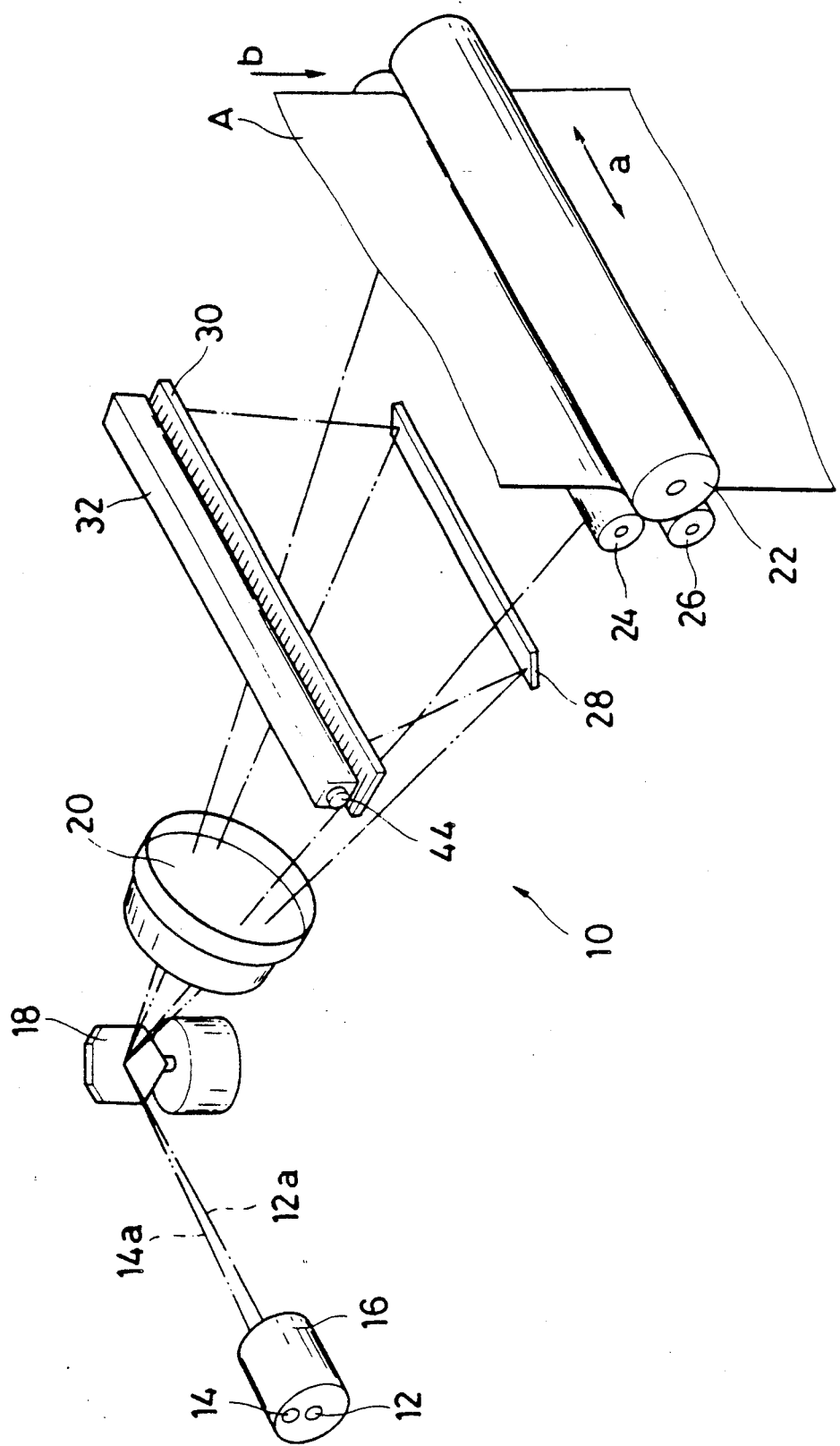
FIG. 1 is a perspective view showing schematically a typical image recording apparatus used as the light beam scanning apparatus of the present invention.

FIG. 1 is a perspective view showing schematically a preferred image recording apparatus used as the light beam scanning apparatus according to the first aspect of the present invention. The image recording apparatus generally indicated by 10 in FIG. 1 is composed of the following basic components: a recording light source 12 that emits a recording light beam 12a (hereinafter referred to simply as a "recording beam"); a grid scanning light source 14 (hereinafter referred to simply as a "synchronizing light source") that emits a grid scanning light beam 14a (hereinafter referred to simply as a "synchronizing beam"); a shaping unit 16 having a beam shaping optical component (not shown); a galvanometer mirror 18; an fθ lens 20; an exposure drum 22 for retaining the sheet-like recording material A in a predetermined position; nip rollers 24 and 26 for transporting the recording material A in contact with the exposure drum 22; an elongated mirror 28 for reflecting the synchronizing beam 14a in a predetermined direction; and a grid 30 and a light collecting bar 32 that cooperate with each other to serve as means of generating an image sync signal.

In the image recording apparatus 10 having the construction described above, the recording beam 12a and the synchronizing beam 14a which ar emitted from the shaping unit 16 are reflected and deflected by the galvanometer mirror 18 in the direction of main scanning indicated by the two-headed arrow a. The deflected recording beam 12a is focused on the recording material A which is being transported in the sub-scanning direction indicated by arrow b as it is held in a predetermined image recording position by means of the exposure drum 22 in contact with the nip rollers 24 and 26. In other words, the recording material A is exposed by two-dimensional scanning with the recording beam 12a to record an image thereon. On the other hand, the synchronizing beam 14a is reflected by the elongated mirror 28 to scan the grid 30 and produce an image sync signal, or a signal for detecting the position of the recording beam 12a.

Thus in the example shown in FIG. 1, the sheet-like recording material A is used as the subject to be scanned of the first aspect of the present invention and the recording light source 12 works as the first light source whereas the synchronizing light source 14 works a the second light source.

Figure 2:
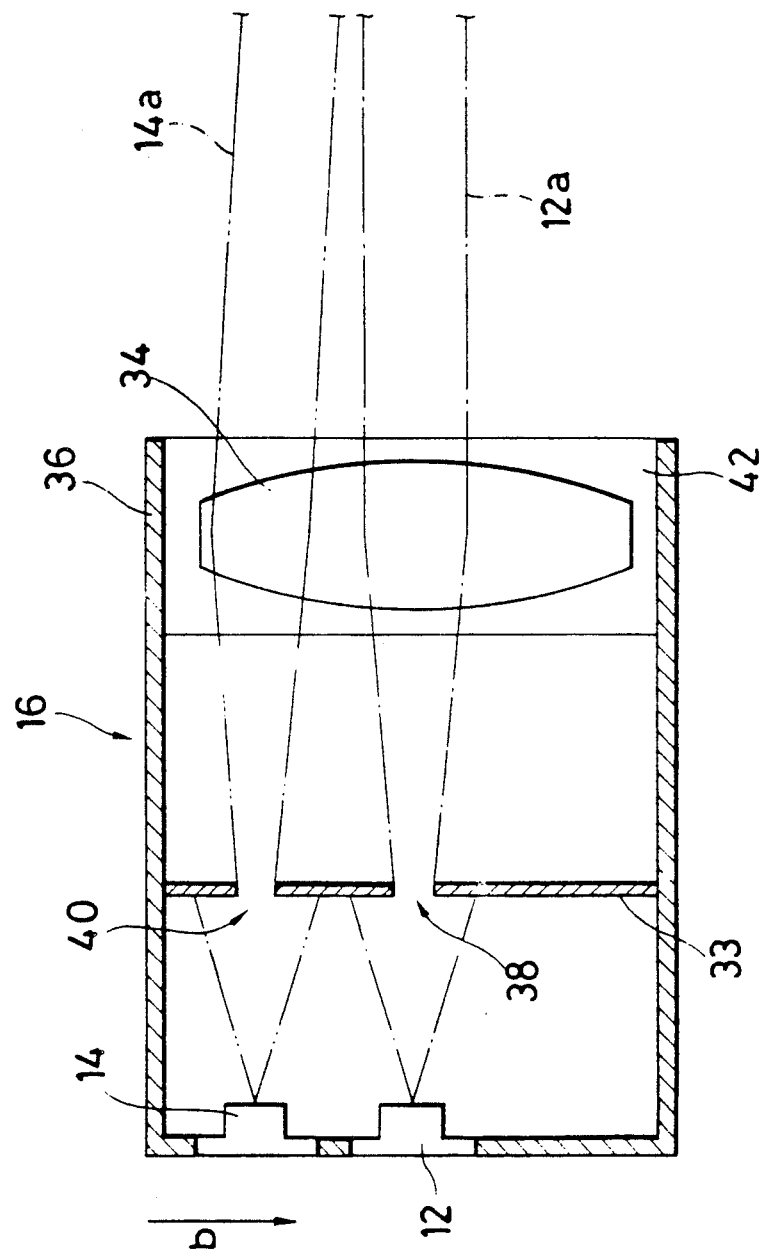
FIG. 2 is a cross-sectional view showing schematically the shaping unit used in the image recording apparatus shown in FIG. 1.

FIG. 2 is a schematic cross-sectional view of the shaping unit 16. As shown, the shaping unit 16 comprises the recording light source 12 for emitting the recording beam 12a, the synchronizing light source 14 for emitting the synchronizing beam 14a, a diaphragm 33 that restricts the flux of the beams emitted from the two light sources, and a collimator lens 34 serving as a component for shaping the two light beams passing through the diaphragm 33. These members are accommodated in a cylindrical housing which is to be closed at one end.

In the image recording apparatus 10 used as the light beam scanning apparatus of the present invention, the recording light source 12 is positioned on the optical axis of the collimator lens 34 which is located at the open end of the housing 36. Hence, the recording beam 12a travels along the optical path of the collimator lens 34.

On the other hand, the synchronizing light source 14 is positioned upstream of the recording light source 12 in the sub-scanning direction in which the recording material A is transported (the term "above" is hereinafter used instead of "upstream of"). Hence, the synchronizing beam 14a is launched into the collimator lens 34 "above" the recording beam 12a.

The light sources that can be used in the present invention are not limited to any particular type and various kinds of light sources that are commonly used in various image recording apparatuses may be employed in the present invention. Illustrative light sources that may be used are light-emitting devices such as a laser, a semiconductor laser such as a laser diode (LD) and a light-emitting diode (LED). From the viewpoints of price and size, a laser diode (i.e., a semiconductor laser) is used with particular advantage.

For increasing the speed of image recording or reading, a multi-beam semiconductor laser capable of simultaneous emission of two or more beams is used more preferably as the recording light source 12 (the first light source).

In the example shown in FIG. 2, the synchronizing light source 14 is positioned above the recording light source 12 but the present invention is by no means limited to this particular case alone and it is of course within the scope of the present invention to locate the synchronizing light source 14 below the recording light source 12.

The beams emitted from the respective light sources are then directed to the diaphragm 33 and the recording beam 12a passes through an aperture 38 whereas the synchronizing beam 14a passes through an aperture 40, whereby the flux of each beam is restricted before it is launched into the collimator lens 34. The size of each aperture in the diaphragm 33 may be determined as appropriate in accordance with the specific use of the light beam scanning apparatus, namely, depending upon whether it is used as an image recording apparatus, an image reading apparatus or otherwise.

The light beams the reflux of which has been restricted by the diaphragm 33 are then launched into the collimator lens 34 serving as a beam shaping optical component, where they are given a predetermined shape.

In the example shown in FIG. 2, the collimator lens 34 is supported and fixed by means of a retainer member 42 at the open end of the housing 36.

In the apparatus of the present invention in which the recording light source 12 and the synchronizing light source 14 are located in the predetermined positions described above, the recording beam 12 travels along the optical axis of the collimator lens 34 whereas the synchronizing beam 14a travels through the collimator lens 34 above the recording beam 12a. Hence, the recording beam 12a is shaped to a desired form by means of the collimator lens 23, whereas the synchronizing beam 14a experiences astigmatism in the focusing position, whereby the resulting beam will be elongated either in the vertical (i.e., sub-scanning) direction.

As a result, a satisfactory image can be formed on the recording material A by means of an appropriately shaped recording beam 12a. Further, as will be described below in detail, the elongated synchronizing beam 14a will not be totally blocked out by dust particles or any other foreign matters on the grid 30, whereby an image sync signal can be generated in a consistent way.

Speaking of the synchronizing beam 14a, its entry into the collimator lens 34 above the recording beam 12a allows it to emerge from the collimator lens 34 in a downward direction forming a predetermined angle with the optical axis.

The angle to be formed between the recording beam 12a and the synchronizing beam 14a after they pass through the collimator lens 34 is not limited to any particular value and may be determined as appropriate for the specific use of the apparatus of the present invention. However, in consideration of such factors as the size of the image recording apparatus and the ease of separation between the recording beam 12a and the synchronizing beam 14a, said angle is preferably within the range of 5–10 degrees, with an angle of about 6 degrees is particularly preferred for the purposes of the present invention.

Using the so-constructed shaping unit 16, the apparatus of the present invention enables satisfactory image recording (or reading) and allows and image sync signal to be generated in a consistent way as already described above. Further, the number of expensive beam shaping optical components such as collimator lenses, which are conventionally used in one-to-one correspondence to light sources, can be sufficiently reduced to realize an inexpensive and compact light beam scanning apparatus.

In the shaping unit 16 shown in FIG. 1, the synchronizing light source 14 is positioned in such a way that its optical axis is parallel to that of the collimator lens 34, and the synchronizing beam 14a emitted from this light source 14 is shaped by falling on the upper part of the collimator lens 34 and emerges therefrom to travel forming a predetermined angle with respect to the recording beam 12a. The present invention, however, is not limited to this particular case alone and the synchronizing light source 14 may be positioned in such a way that its optical axis is inclined with respect to that of the collimator lens 34 to produce a synchronizing beam 14a that passes through the principal point of the collimator lens 34, whereby the emitted synchronizing beam 14a is appropriately shaped and emerges from the collimator lens 34 to travel at a predetermined angle with respect to the recording beam 12a.

The shaping unit 16 constructed in the manner shown in FIG. 2 has the advantage of reducing the size of a light deflector such as the galvanometer mirror 18 to be described later in this specification. The alternative construction in which the optical axis of the synchronizing light source 14 is tilted in such a way that the synchronizing beam 14a passes through the principal point of a beam shaping optical component such as the collimator lens 34 has the advantage of reducing the size of the beam shaping optical component. A suitable construction may be selected as appropriate for the type of light beam scanning apparatus to which said shaping unit is to be applied.

The recording beam 12a and the synchronizing beam 14a emerging from the shaping unit 16 are then reflected by the galvanometer mirror 18 serving as a light deflector and deflected in the main scanning direction indicated by the two-headed arrow a. The light deflector that can be used in the present invention is in no way limited to the galvanometer mirror 18 and may be selected from various known light deflectors including a polygonal mirror.

The light beams reflected and deflected by the galvanometer mirror 18 are then launched into the fθ lens 20 and are adjusted in such a way that they are focused at predetermined positions in the form of predetermined beam spots. In the present invention, the recording beam 12a and the synchronizing beam 14a travel along paths that differ in the sub-scanning direction in which the recording material A is transported, so the apparatus is preferably constructed in such a way that the recording beam 12a passes along the center line of the fθ lens 20.

The recording beam 12a emerging from the fθ lens 20 focuses on the recording material A which is being transported in the sub-scanning direction indicated by arrow b as it is held in a predetermined image recording position by means of the exposure drum 22 in contact with nip rollers 24 and 26, whereby the recording material A is exposed by two-dimensional scanning for image recording.

The synchronizing beam 14a emerging from the fθ lens 20 is reflected upward by the elongated mirror 28 to scan the grid 30. The synchronizing beam 14a passing through the grid 30 is collected by the collecting bar 32 and its quantity is measured with a photodetector 44 such as a photomultiplier tube for conversion to an electric signal. The synchronizing beam 14a incident on the grid 30 has been reflected and deflected in the main scanning direction (arrow a) by the the galvanometer mirror 18 in entirely the same way as in the case of the recording beam 12a which is used to scan and expose the recording material A. Hence, a sync signal for detecting the correct position of the recording beam 12a can be obtained from the electric signal that has been produced by the periodic changes in the quantity of light in response to the scanning of the grid 30 with the synchronizing beam 14a. The sync signal thus obtained allows the main scanning of the recording material A to be carried out in a more precise way by means of the recording beam 12a.

Figure 3:
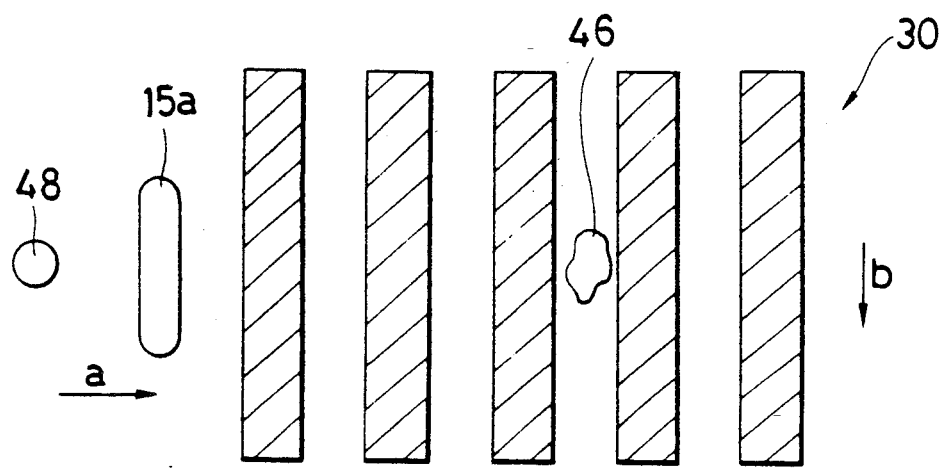
FIG. 3 is a partial enlarged schematic view of the grid used in the apparatus shown in FIG. 1.
Figure 4A:
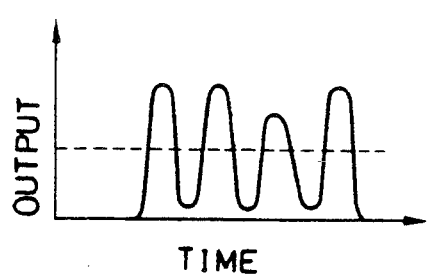
FIGS. 4a and 4b are schematic views that show the light detection signals obtained from the image recording apparatus shown in FIG. 1 and from a prior art apparatus, respectively.
Figure 4B:
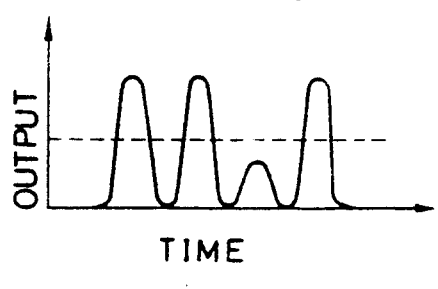
Figure 5A:
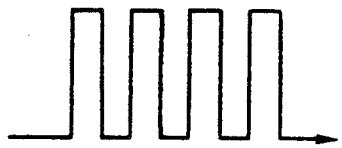
FIGS. 5a and 5b are schematic views of the output signals obtained when the light detection signals shown in FIGS. 4a and 4b, respectively, and digitized.
Figure 5B:
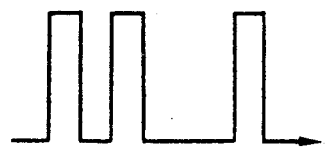

As already mentioned, the synchronizing beam 14a passes through the collimator lens 34 above its optical axis, so the resulting astigmatism permits said beam to form a spot on the focal position (i.e., the grid 30) that is elongated in the sub-scanning direction as shown by beam spot 15a in FIG. 3. This offers the advantage that even if dust particles or any other foreign matters are deposited on the grid 30, the synchronizing beam 14a will not be totally blocked by these and a desired image sync signal can be consistently obtained. FIG. 3 illustrates the case where an objectionable material 46 such as dust or dirt particles are deposited in a light-transparent area of the grid 30. If, in this case, the grid 30 is scanned with the synchronizing beam 14a in the direction of main scanning, the beam spot 15a formed of the synchronizing beam 14a on the grid surface is elongated in the sub-scanning direction and will not be totally blocked by the objectionable material 46, as a result of which all of the output signal levels produced from the photodetector 44 are higher than a predetermined threshold as shown in FIG. 4a. However, if the grid 30 is scanned with an ordinary convergent synchronizing beam 48, it is substantially blocked by the objectionable material 46 and the output signal from the photodetector 44 will become very weak when it scans the area of the grid where the objectionable material 46 is deposited (see FIG. 4b). If the output signal from the photodetector 44 is digitized to create a detection voltage that is indicated by the dashed line in FIG. 4, an error is produced from the blocked area as shown in FIG. 5b for the case where the grid is scanned with the ordinary convergent synchronizing beam 48, and no exact image sync signal can be obtained. On the other hand, scanning with the synchronizing beam 14a as in the present invention insures consistent production of a digitized output signal as shown in FIG. 5a, whereby an exact image sync signal can be obtained in all instances.

It should be noted here that even if the optical axis of the synchronizing light source 14 is tilted in such a way that the synchronizing beam 14a passes through the principal point of the collimator lens 34, astigmatism is also caused by the glancing entry of the beam 14a into the collimator lens 34 and the resulting beam spot is likewise elongated in the sub-scanning direction, whereby an exact image sync signal can always be obtained.

Figure 6:
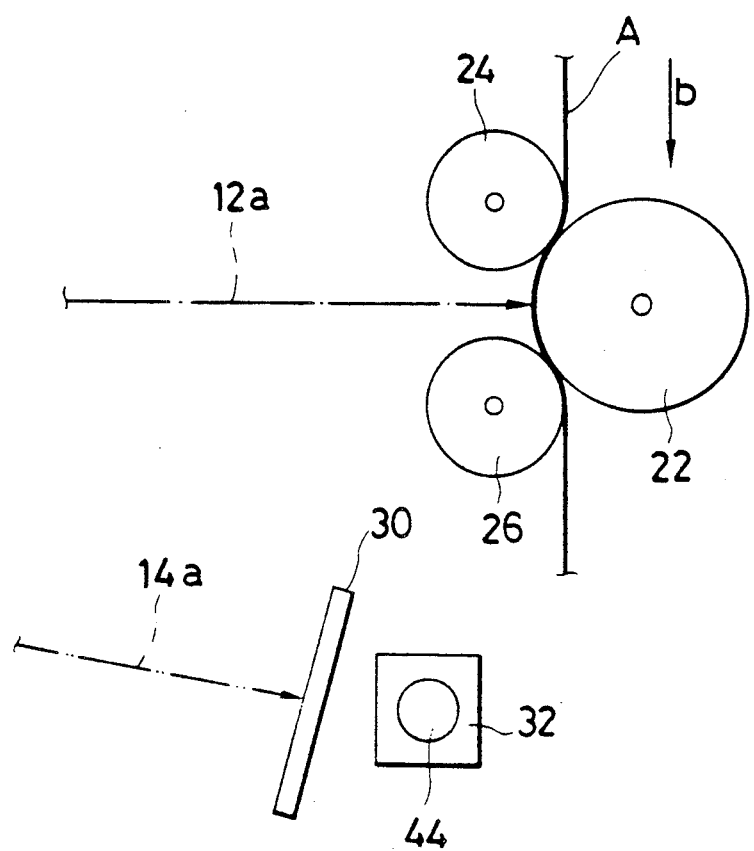
FIG. 6 is a front view showing schematically part of another image recording apparatus used as the light beam scanning apparatus of the present invention.

In the example shown in FIG. 1, the synchronizing beam 14a is reflected upward by the elongated mirror 28 for scanning the grid 30. The present invention, however, is not limited to this particular case alone and the grid 30 and the light collecting bar 32 may be positioned as shown in FIG. 6 so that they receive the light beam from the shaping unit 16 that travels downward of the exposure drum 22. This arrangement has the advantage of eliminating the elongated mirror 28 so as to construct a light beam scanning apparatus at a further reduced cost.

The subjects to be scanned which can be used in the light beam scanning apparatus of the present invention include not only the sheet-like recording material A described above, but also the drum-like recording materials and other recording materials. The recording materials also include electrophotographic receptors, the light-sensitive materials such as silver halide photographic materials, pressure-sensitive, light-sensitive materials, photopolymers, thermal light-sensitive materials, diazo light-sensitive materials and others.

The foregoing description concerns the case where the light beam scanning apparatus of the present invention is applied as an image recording apparatus, with the recording material A being used as a subject to be scanned. Needless to say, the light beam scanning apparatus of the present invention may be applied as an image reading apparatus, with subject to be scanned being an image carrying document such as a photographic document or printed document and a latent image carrying materials, and with the first light source used as a reading light source which emits a light beam for illuminating the image on the document to produce reflected light which is subjected to photometry with a variety of light detecting means.

As described above in detail, the light beam scanning apparatus according to the first aspect of the present invention obviates the use of an expensive modulator such as AOM and optical elements for separating and synthesizing light beams, whereby the number of expensive optical parts including beam shaping optical components such as collimator lenses can be reduced. As a result, the cost and size of the light beam scanning apparatus can be sufficiently reduced to realize an inexpensive and small image recording or reading apparatus as an application of such apparatus.

Further, the first and second light sources are located in the predetermined positions specified herein, so despite the low cost and small size of the light beam scanning apparatus, the light beam from the first light source passes through the center of the beam shaping optical component to be appropriately shaped for permitting an image to be recorded or read in a satisfactory manner.

In addition, the synchronizing beam from the second light source passes through the beam shaping optical component along a path other that its optical axis, and the resulting astigmatism at the focus position of said beam will allow it to fall on a predetermined position on the image sync signal generating means such as a grid, whereby a beam spot is formed that is elongated in the sub-scanning direction. Hence, if the grid is scanned with this elongated beam spot, the chance of the synchronizing beam being completely blocked by dust or dirt particles on the grid is substantially reduced to insure that a desired image sync signal is obtained on all occasions.

Preferably, each of the first and second light sources may be composed of a laser diode and this offers the advantage of further reducing the overall size and cost of the light beam scanning apparatus.

A light beam adjusting mechanism according to the second aspect of the present invention is now described in detail with reference to FIGS. 7-10. This light beam adjusting mechanism is suitable for use with the compact and inexpensive light beam scanning apparatus of raster scanning type according to the first aspect of the present invention which comprises a beam shaping optical component, a first light source positioned on the optical axis of this beam shaping optical component, and a second light source positioned in close proximity with this first light source. The mechanism is intended to adjust the optical distances of the light beams from the respective light sources, as well as the positions at which these light beams are launched into the light beam shaping optical component.

Having the construction described above, the light beam adjusting mechanism according to the second aspect of the present invention has the advantage that after adjusting the optical distance of the light beam issuing from the first light source can be adjusted in an easy and yet precise way by moving the third sleeve relative to the second sleeve along the length of the path in which the light beam travels.

When a light source such as a laser diode that inherently causes astigmatism is to be used, the beam shaping optical component such as a collimator lens is tilted with respect to the optical axis in order to eliminate the astigmatism, and in this case, the resulting inclination of the spot formed of the light beam issuing from the second light source can be corrected in an easy and yet correct manner by rotating the third sleeve about the second sleeve. As a result, both the scanning beam and the synchronizing beam can be properly shaped for scanning the subject to be scanned and the image synchronizing grid, respectively.

The light beam adjusting mechanism according to the second aspect of the present invention is described below in greater detail with reference to the preferred embodiment shown in FIGS. 7-10.

Figure 7:
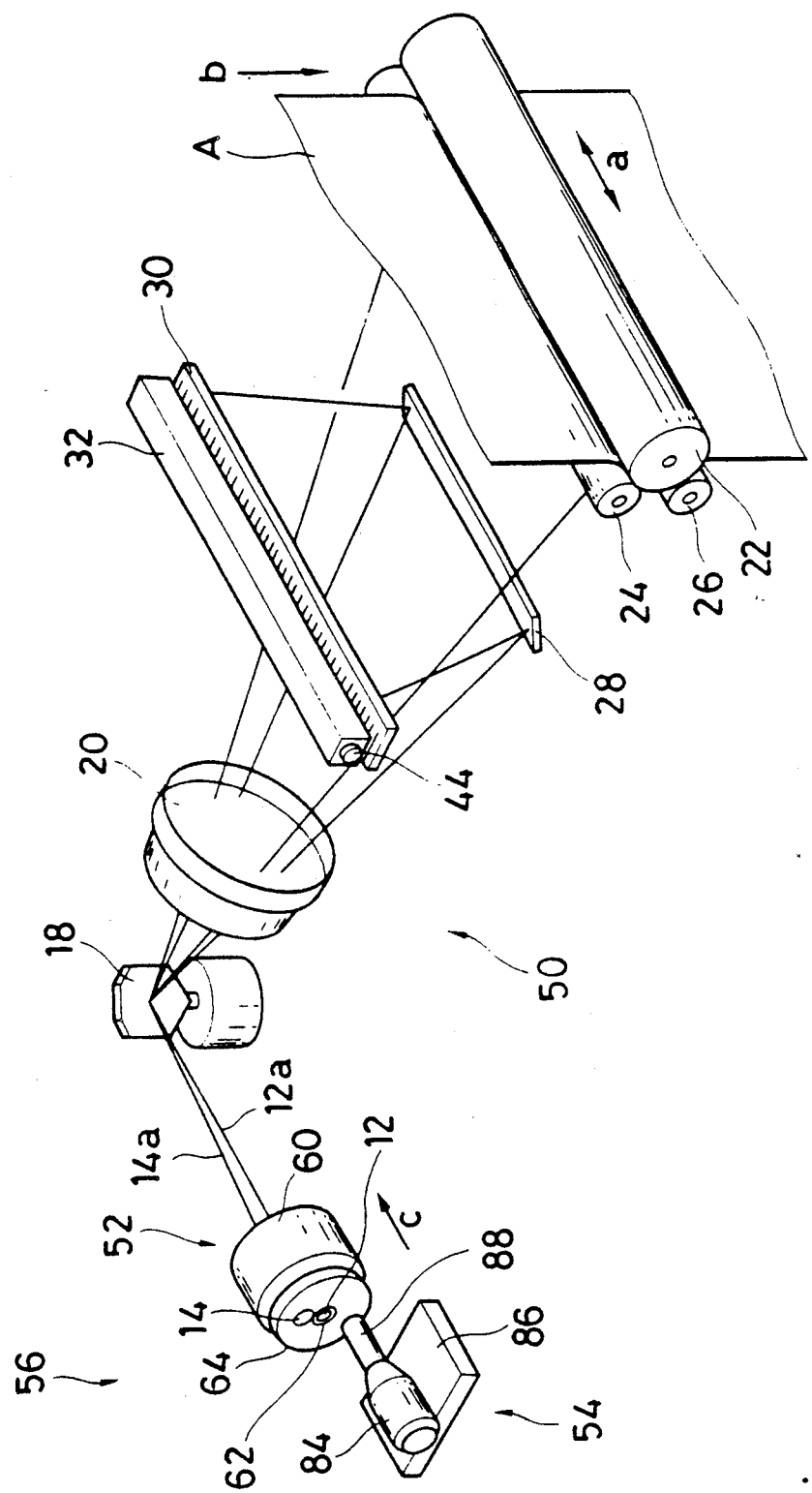
FIG. 7 is a perspective view showing schematically a typical image recording apparatus that uses the light beam adjusting mechanism of the present invention.

FIG. 7 is a perspective view showing schematically a preferred image recording apparatus that uses the light beam adjusting mechanism according to the second aspect of the present invention. The image recording apparatus generally indicated by 50 in FIG. 7 has essentially the same construction as the image recording apparatus 10 according to the first aspect of the present invention which is shown in FIG. 1, except for a shaping unit 52 having a recording light source 12 for emitting a recording beam 12a, a grid scanning light source 14 for emitting a synchronizing beam 14a and a beam shaping optical component (not shown), and an adjusting tool 54 that is detachably positioned behind the shaping unit 52 (the term "behind" as used herein means "upstream of the path in which a light beam travels") and that is manipulated to adjust the positions of the light sources 12 and 14 in the shaping unit 52. Thus, the components that are common to FIGS. 1 and 7 are identified by like numerals and will not be described in detail. In the example shown in FIG. 7, the recording light source 12 works as the first light source and the synchronizing light source 14 as the second light source, with the shaping unit 52 being equipped with the light beam adjusting mechanism according to the second aspect of the present invention which is generally indicated by 56.

Figure 8A:
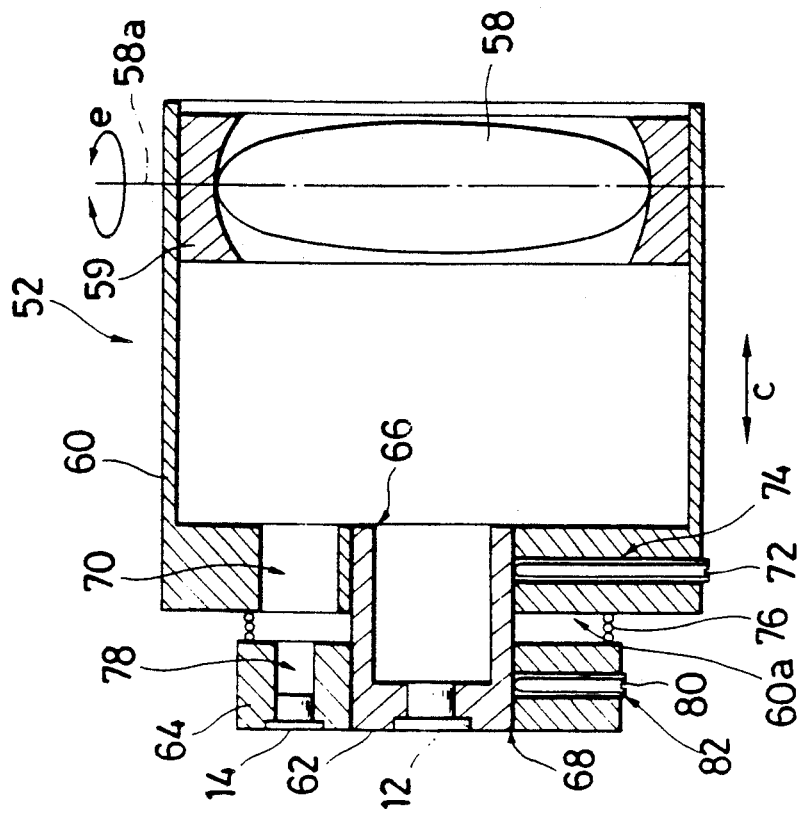
FIGS. 8a and 8b are a cross-sectional view and a rear side view, respectively, of the shaping unit used in the image recording apparatus shown in FIG. 7.
Figure 8B:
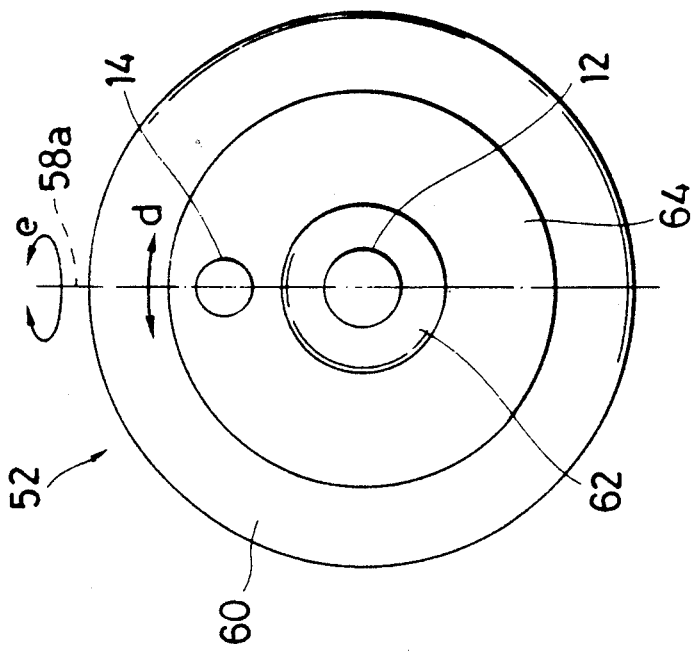

FIG. 8a is a schematic cross section of the shaping unit 52 and FIG. 8b is a rear side view of the same. In the illustrated image recording apparatus 50, the shaping unit 52 performs the function of adjusting the positions of the respective light sources 12 and 14 by means of the light beam adjusting mechanism 56 according to the second aspect of the present invention.

The shaping unit 52 consists basically of a cylindrical first sleeve 60 with a closed end for holding the collimator lens 58, a cylindrical second sleeve 62 for holding the recording light source 12, and a cylindrical third sleeve 64 for holding the synchronizing light source 14. One end of the second sleeve 62 is inserted into the first sleeve 60 through an opening 66 at its closed end, and the other end of the second sleeve 62 is inserted into the third sleeve 64 through an opening 68 in it. The third sleeve 64 is adapted to be not only rotatable around the second sleeve 62 in the direction indicated by the two-headed arrow d but also movable relative to the second sleeve 62 in the direction indicated by arrow c, whereby the light beam adjusting mechanism 56 is constructed.

The example shown in FIGS. 7 and 8 refers to a preferred case in which the second sleeve 62 is adapted to be movable relative to the first sleeve 60 in the direction indicated by arrow c.

As already mentioned, the first sleeve 60 has a cylindrical shape which is closed at one end and is used to hold the collimator lens 58. The collimator lens 58 is fixed at the open end of the first sleeve 60 with the aid of a retaining member 59 in such a way that its optical axis coincides with the center line of the cylindrical first sleeve 60.

In order to compensate for the astigmatism inherent in the recording light source 12 so that the recording beam 12a will be properly focused on the recording material A, the first sleeve 60 is so constructed that the collimator lens 58 is fixed to the retainer 59, with it being tilted with respect to the optical axis by, for example, rotating it about its center line 58a which extends in the sub-scanning direction (indicated by arrow b). The direction of such rotation the collimator lens 58 is indicated by e in FIG. 8. The closed end 60a of the first sleeve 60 has a central opening 66 through which the second sleeve 62 is to be inserted, and the center of this opening coincides with the center line of the first sleeve 60. A through-hole 70 that admits the passage of the synchronizing beam 14a is formed above the central opening 66 (i.e., upstream of the transport path in the sub-scanning direction).

The first sleeve 60 has a threaded hole 74 formed in the lateral side near the end 60a and a fastening screw 72 is to be threaded into this hole for securing the second sleeve 62 to the first sleeve 60. In the shaping unit 52 shown in FIGS. 7 and 8, the first sleeve 60 is fixed to an optical substrate, an optical unit or some other suitable member in such a way that the second sleeve 62 is movable relative to the first sleeve 60 in the direction indicated by arrow c.

Like the first sleeve 60, the second sleeve 62 has a cylindrical shape which is closed at one end and which has the recording light source 12 held at said closed end with its optical axis being in registry with the center line of the second sleeve 62. The second sleeve 62 is inserted into the first sleeve 60 through the opening 66 and held therein. The recording light source 12 is positioned in such a way that its optical axis coincides with the center line of the second sleeve 62. Further, as already mentioned the opening 66 through which the second sleeve 62 is inserted is formed on the center line of the first sleeve 60. Consequently, the recording light source 12 is held on the optical axis of the collimator lens 58. Hence, despite the use of a single collimator lens 58 for both the first and second light sources 12 and 14, the recording beam 12a is properly shaped for scanning the recording material A, whereby satisfactory image recording can be accomplished.

The example shown in FIGS. 7 and 8 refers to a preferred case in which the second sleeve 62 is capable of moving in the direction of arrow c parallel to the path in which a light beam travels and in which it can be secured to the first sleeve 60 by means of the fastening screw 72.

Having the construction described above, the light beam adjusting mechanism 56 according to the second aspect of the present invention offers the following advantage when a need arises to adjust the optical distance of the recording beam 12a for some reasons such as the occurrence of an error in the focal length of the fθ lens 20 which is positioned behind this mechanism. Stated more specifically, after rough adjustment is made, the second sleeve 62 is moved in the direction of arrow c by the adjusting tool 54 (to be described below) such as a micrometer, whereby the optical distance of the recording beam 12a is finely adjusted in an easy and yet precise manner. After these adjustments, the second sleeve 62 can be secured to the first sleeve 60 by means of the fastening screw 72.

The third sleeve 64 also has a cylindrical shape and it is supported by the second sleeve 62 and, hence, in the shaping unit 52 by inserting the second sleeve 62 into a central opening 68 in the third sleeve 64. A spring 76 is provided between the third sleeve 64 and the end 60a of the first sleeve 60 to urge the third sleeve 64 in a direction opposite to the direction in which a light beam travels. This urging action enables the positions of the second sleeve 62 and the third sleeve 64 to be adjusted in the direction of arrow c by means of the adjusting tool 54. The third sleeve 64 has a through-hole 78 formed in a position corresponding to the through-hole 70 in the first sleeve 60, and the synchronizing light source 14 is retained in this through-hole 78. Hence, the synchronizing beam 14a emitted from the synchronizing light source 14 passes through holes 78 and 70 and is shaped by being launched into the collimator lens 58 above its optical axis. And the resulting astigmatism allows the synchronizing beam 14a to focus on the grid 30 to form a beam spot that is elongated in the sub-scanning direction.

The synchronizing light source 14 is held in such a way that the synchronizing beam 14a emerging from the collimator lens 58 will form a predetermined angle with respect to the recording beam 12a. This angle is not limited to any particular value and may be determined as appropriate for the type of apparatus to which the beam adjusting mechanism under discussion is to be applied. As a guide, the range of 5–10 degrees is preferred from the viewpoints of such factors as the size of the image recording apparatus and the ease of separation between the recording beam 12a and the synchronizing beam 14a, with the approximate value of 6 degrees being particularly preferred in the present invention.

The third sleeve 64 has a threaded hole 82 that penetrates its lateral side to reach the opening 68 and into which a fastening screw 80 is to be threaded. Hence, the third sleeve 64 can be secured to the second sleeve 62 by means of the fastening sleeve 80. The third sleeve 64 is fitted over the second sleeve 62 and supported in such a way that it is not only movable in the direction of arrow c but also rotatable about the second sleeve 62 in the direction of arrow d, whereby the light beam adjusting mechanism 56 is constructed in accordance with the second aspect of the present invention.

For satisfactory image recording (or reading), the optical distance of the recording and synchronizing beams must be adjusted properly. In accordance with the second aspect of the present invention, the third sleeve 64 is movable in the direction of arrow c, so the light beam adjusting mechanism under consideration enables the optical distance of the synchronizing beam 14a to be adjusted independently of the recording beam 12a subsequent to its adjustment for the optical distance, and this insures the production of a correct image sync signal.

As already mentioned, the astigmatism inherent in the recording light source 12 is eliminated by holding the collimator lens 58 in such a way that it is tilted very slightly with respect to the optical axis by, for example, rotating it by a very small angle in the direction of arrow e. As also mentioned above in connection with the shaping unit 52, the synchronizing beam 14a passes through the collimator lens 58 above its optical axis, so the resulting astigmatism permits said beam to form a spot on the grid 30 that is elongated in the sub-scanning direction (indicated by arrow b and in which the recording material A is transported) and shown by beam spot 15b in FIG. 9. This offers the advantage that even if dust or dirt particles or any other foreign matters are deposited on the grid 30, the synchronizing beam 14a will not be totally blocked by these objectionable materials and a desired image sync signal can be consistently obtained.

Figure 9:
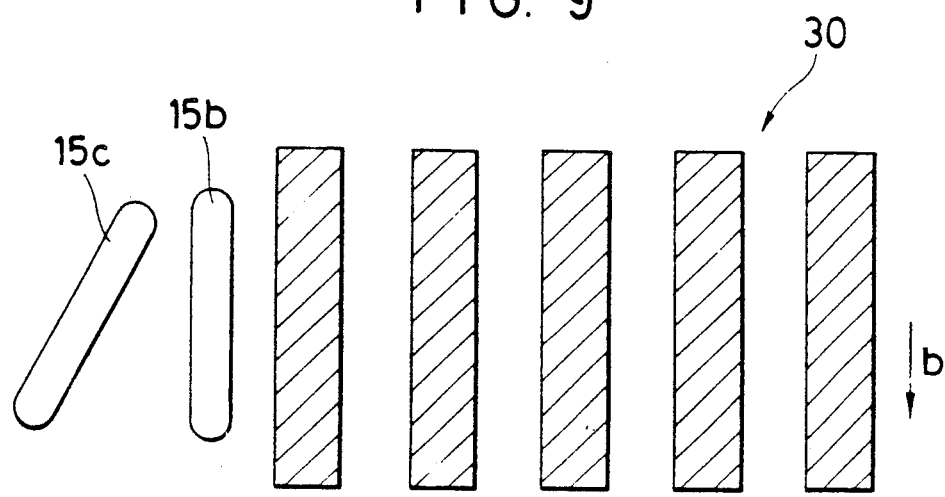
FIG. 9 is a partial enlarged schematic view of the grid used in the image recording apparatus shown in FIG. 7.
Figure 10A:
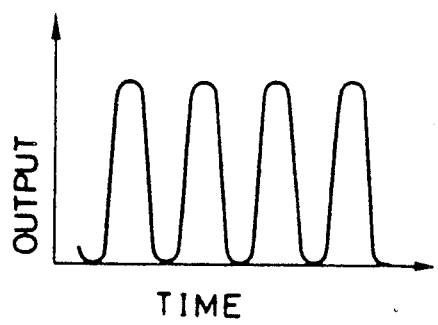
FIGS. 10a and 10b are schematic views that show the light detection signals obtained from the image recording apparatus shown in FIG. 7 where the synchronizing beam forms beam spots having different inclinations with respect to the grid.
Figure 10B:
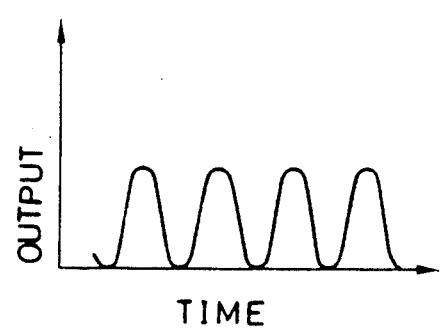

However, if the collimator lens 58 is rotated, for example, in the direction indicated by arrow e with a view to compensating for the astigmatism inherent in the recording light source 12, the synchronizing beam 14a will form a spot that is oblique with respect to the grid 30 as shown by beam spot 15c in FIG. 9. If this elongated beam spot is used to scan the grid 30, the synchronizing beam 14 will not be properly launched into the photodetector 44 and, as shown in FIG. 10b, the output signal from the photodetector 44 will become very weak compared to the output signal produced when the grid 30 is scanned with the beam spot 15b as shown in FIG. 10a. If the inclination of the beam spot 15c is excessive, the peak output will be smaller than a predetermined threshold level and no desired image sync signal can be obtained, with occasional occurrence of errors when the output is converted to a digital signal in order to produce an image synchronizing electric signal.

However, in the shaping unit 52 which adopts the light beam adjusting mechanism 56 in accordance with the second aspect of the present invention, the third sleeve 64 is rotated about the second sleeve 62 in the direction of arrow d, whereby the angle by which the spot of synchronizing beam 14a is inclined with respect to the grid 30 can be easily corrected in a proper way to insure consistent production of a desired image sync signal. Therefore, the through-hole 70 to be formed in the end face 60a of the first sleeve 60a must be deep enough to permit the third sleeve 64 to be rotated by a maximum amount.

As shown in FIG. 7, when the recording beam 12a and the synchronizing beam 14a are to be adjusted, the adjusting tool 54 may be provided behind the shaping unit 52 for adjusting the positions of the second sleeve 62 and the third sleeve 64 along the length indicated by arrow c. The adjusting tool 54 consists of a micrometer 84 and a micrometer stage 86 as a support of it. For adjusting the positions of the second sleeve 62 and the third sleeve 64, the micrometer stage 86 is fixed on an optical bench (not shown) in such a way that the spindle 88 of the micrometer 84 will come to position in which it is capable of pressing the end face of the third sleeve 64 and, thereafter, the spindle 88 is either advanced or retracted so that the sleeve 62 or 64 is properly adjusted for their position to achieve the desired adjustment of the light source 12 or 14.

In this connection, is should be remembered that the third sleeve 64 is urged backward by the spring 76. Thus, if the second sleeve 42 (or third sleeve 64) is secured by tightening the fastening screw 72 (or 80) or if it is released by loosening said screw, and if the third sleeve 64 is pushed by the spindle 88 of the micrometer 84, the positions of the second sleeve 62 and the third sleeve 64, namely, the positions of the recording light source 12 and the synchronizing light source 14 along the length indicated by arrow c, can be easily adjusted in a precise way.

The process of adjusting the positions of the recording light source 12 and the synchronizing light source 14 in the shaping unit 52 shown in FIGS. 7 and 8 will proceed as follows. First, provide the micrometer stage 86 in a predetermined position so that the spindle 88 will be in a state where it is capable of pressing the end face of the third sleeve 64. Then, loosen the fastening screw 72 so that the second sleeve 62 and the third sleeve 64 become simultaneously movable in the direction of arrow c. Push the third sleeve 64 by the spindle 88, to thereby adjust the position of the recording light source 12 in the direction of c. When the positional adjustment of the recording light source 12 is completed, tighten the fastening screw 72 to secure the second sleeve 62. Then, loosen the fastening screw 80 so that only the third sleeve 64 will become movable. After loosening the screw 80, push the spindle 88 again to move the third sleeve 64 so that the position of the synchronizing light source 12 is adjusted in the direction of arrow c. Subsequently, rotate the third sleeve 64 in the direction of arrow d in proportion to the amount of rotation of the collimator lens 58 in the direction of arrow e, whereby the spot of synchronizing beam 14a on the grid 30 is adjusted.

After all of the steps described above are completed, tighten the screw 80 for securing the third sleeve 64 and remove the micrometer stage 86 from the optical platen (not shown). The positional adjustment of the first and second light sources is completed by removing the adjusting tool 54 from the image recording apparatus 50.

The light beam adjusting mechanism 56 according to the second aspect of the present invention has the advantage that not only the adjustment of the recording light source 12 and the synchronizing light source 14 in the direction of arrow c (in which the light beams travel) but also the adjustment of the position in which the synchronizing beam 14a is incident on the collimator lens 58 (the latter adjustment becomes necessary to compensate for the astigmatism inherent in the recording light source 12) can be easily accomplished with high precision by the simple process described above.

In the example described above, the adjusting tool 54 is mounted in the image recording apparatus 50 only when the first and second light sources 12 and 14 are to be adjusted. However, the present invention is in no way limited to this particular case and said tool may be permanently fixed in the recording apparatus as long as it will not obstruct efficient scanning with a light beam during image recording, reading or other operations.

It should also be noted that the light beam scanning apparatus to which the light beam adjusting mechanism in accordance with the second aspect of the present invention can be applied is by no means limited to the image recording apparatus described above, and as in the first aspect of the invention, said mechanism may be applied to any other types of image recording and reading apparatuses that are categorized as light beam scanning apparatus.

The light beam adjusting mechanism according to the second aspect of the present invention is suitable for use with the compact and inexpensive light beam scanning apparatus according to the first aspect of the present invention which operates basically on the principle of raster scanning and comprises a first light source, a second light source and a beam shaping optical component, in which apparatus, the first light source is positioned on the optical axis of the beam shaping optical component whereas the second light source is positioned in close proximity with this first light source. This mechanism is intended to adjust the optical distances of the light beams from the respective light sources, as well as the positions at which these light beams are launched into the beam shaping optical component.

Having the construction described above, the light beam adjusting mechanism according to the second aspect of the present invention has the advantage that after adjusting the optical distance of the light beam issuing from the first light source, the optical distance of the light beam issuing from the second light source can be adjusted in an easy and yet precise way by moving the third sleeve relative to the second sleeve along the length of the path in which the light beam travels.

If a light source such as a laser diode that inherently causes astigmatism is used and when the beam shaping optical component such as a collimator lens is tilted with respect to the optical axis in order to eliminate the astigmatism, the resulting inclination of the spot formed of the light beam issuing from the second light source can be corrected in any easy and yet correct manner by rotating the third sleeve about the second sleeve. As a results, both the scanning beam and the synchronizing beam can be properly shaped from scanning the subject to be scanned and the image synchronizing grid, respectively.

In a particularly preferred embodiment of the second aspect of the present invention, the second sleeve is adapted to be movable relative to the first sleeve along the length of the path in which a light beam travels. This enables the optical distance of the light beam issuing from the first light source to be properly adjusted by moving the second sleeve in a direction parallel to the travel of the light beam, with the first sleeve fixed on a suitable support, whereby optical adjustments required of the light beam scanning apparatus can be carried out in an easy and yet precise manner.

What is claimed is:

1. A light beam scanning apparatus that uses a light beam deflected in the direction of main scanning in order to perform two-dimensional scanning of a subject to be scanned that is moving in a sub-scanning direction which is generally perpendicular to said direction of main scanning, which apparatus comprises:
   generating means for generating an image sync signal;
   a first light source that emits a first light beam for scanning said subject;
   a second light source that emits a second light beam for scanning said means for generating an image sync signal; and
   a single beam shaping optical component through which said first and second beams pass, said component shaping the first and second light beams emitted from said first and second light sources,
   said first light source being positioned on the optical axis of said beam shaping optical component, and said second light source being positioned either ahead of or behind said first light source in said sub-scanning direction such that said first light beam passes through the center of said component and said second light beam passes through said component along a line offset from the center line in said sub-scanning direction so that the second light beam emitted on said generating means is elongated in the sub-scanning direction.

2. A light beam scanning apparatus according to claim 1 wherein each of said first and second light sources is a laser diode.

3. A light beam scanning apparatus according to claim 1 wherein said means of generating an image sync signal is a grid.

4. A light beam scanning apparatus according to claim 1 wherein said beam shaping optical component is a collimator lens through which the first and second light beams from both of said first and second light sources will pass.

5. A light beam scanning apparatus according to claim 1 wherein said first light source said second light source and said beam shaping optical component are integrated in a unitary assembly.

6. A light beam scanning apparatus according to claim 1 wherein the scanning beam emitted from said first light source forms and angle of 5-10 degrees with the synchronizing beam emitted from said second light source.

7. A light beam scanning apparatus according to claim 1 wherein said subject to be scanned is a sheet-like recording material.

8. A light beam adjusting mechanism for use with a light beam scanning apparatus in which a light beam emitted from a light source and deflected in the direction of main scanning is used to perform two-dimensional scanning of a subject to be scanned that is moving in a sub-scanning direction which is generally perpendicular to said direction of main scanning, and a light beam emitted from another light source is used to obtain an image sync signal, which mechanism comprises:
   a first sleeve for retaining a beam shaping optical component in its center;
   a second sleeve that is positioned in the center of said first sleeve and that retains the first light source on the optical axis of said beam shaping optical component; and
   a third sleeve that is fitted over said second sleeve for retaining said second light source,
   said third sleeve being not only movable along the optical axis of said beam shaping optical component but also rotatable with respect to said second sleeve.

9. A light beam adjusting mechanism according to claim 8 wherein each of said first and second light sources is a laser diode.

10. A light beam adjusting mechanism according to claim 8 wherein said first light source is a scanning light source for scanning said subject and said second light source is a synchronizing light source for generating said image sync signal.

11. A light beam adjusting mechanism according to claim 8 wherein said beam shaping optical component is a collimator lens through which the light beams from both of said first and second light sources will pass.

12. A light beam adjusting mechanism according to claim 11 wherein said collimator lens is rotatable about an axis perpendicular to the center line of said first sleeve.

13. A light beam adjusting mechanism according to claim 8 wherein said image sync signal is obtained by scanning an image sync signal generating means with the light beam emitted from said second light source and which has been deflected in the same way as the light beam emitted from said first light source.

14. A light beam adjusting mechanism according to claim 13 wherein said image sync signal generating means is a grid.

15. A light beam adjusting mechanism according to claim 8 wherein said second sleeve is movable along the optical axis of said beam shaping optical component with respect to said first sleeve.

* * * * *